(12) United States Patent
Cymbal et al.

(10) Patent No.: US 7,780,196 B2
(45) Date of Patent: Aug. 24, 2010

(54) ENERGY ABSORBING STEERING COLUMN ASSEMBLY

(75) Inventors: William D. Cymbal, Freeland, MI (US); Marvin V. Manwaring, Clio, MI (US); Ravi Ravindra, Saginaw, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 279 days.

(21) Appl. No.: 11/543,564

(22) Filed: Oct. 5, 2006

(65) Prior Publication Data
US 2008/0084055 A1   Apr. 10, 2008

(51) Int. Cl.
B62D 1/187   (2006.01)
B62D 1/19    (2006.01)

(52) U.S. Cl. .................. 280/777; 280/775; 74/493; 188/374

(58) Field of Classification Search ............ 74/493; 188/371, 374; 280/775, 777
See application file for complete search history.

(56) References Cited

U.S. PATENT DOCUMENTS

| | | | |
|---|---|---|---|
| 5,487,562 A | 1/1996 | Hedderly et al. | |
| 5,562,307 A | 10/1996 | Connor | |
| 5,961,146 A | 10/1999 | Matsumoto et al. | |
| 6,170,874 B1 * | 1/2001 | Fosse | 280/777 |
| 6,189,405 B1 * | 2/2001 | Yazane | 74/493 |
| 6,224,104 B1 | 5/2001 | Hibino | |
| 6,264,240 B1 | 7/2001 | Hancock | |
| 6,322,103 B1 * | 11/2001 | Li et al. | 280/777 |
| 6,419,269 B1 * | 7/2002 | Manwaring et al. | 280/775 |
| 6,543,807 B2 * | 4/2003 | Fujiu et al. | 280/775 |
| 6,575,497 B1 * | 6/2003 | McCarthy et al. | 280/777 |
| 6,652,002 B2 * | 11/2003 | Li et al. | 280/777 |
| 6,655,716 B2 * | 12/2003 | Riefe | 280/777 |
| 6,659,504 B2 * | 12/2003 | Riefe et al. | 280/777 |
| 6,726,248 B2 * | 4/2004 | Satou et al. | 280/777 |
| 6,769,715 B2 | 8/2004 | Riefe et al. | |
| 7,011,340 B2 * | 3/2006 | Tsuji et al. | 280/775 |
| 7,325,833 B2 * | 2/2008 | Sawada et al. | 280/775 |
| 7,328,917 B2 * | 2/2008 | Sawada et al. | 280/775 |
| 7,354,068 B2 * | 4/2008 | Ishida et al. | 280/775 |
| 7,401,813 B2 * | 7/2008 | Sawada et al. | 280/775 |
| 2003/0164608 A1 * | 9/2003 | Morita et al. | 280/775 |
| 2005/0012316 A1 | 1/2005 | Rhouma et al. | |
| 2005/0104353 A1 * | 5/2005 | Ikeda et al. | 280/775 |

* cited by examiner

*Primary Examiner*—Paul N Dickson
*Assistant Examiner*—Laura Freedman
(74) *Attorney, Agent, or Firm*—Cantor Colburn LLP

(57) ABSTRACT

A collapsible steering column assembly has a steering column with a jacket movable along a longitudinal axis for telescoping and collapsing movement. The jacket is movable about a pivot axis for tilting movement between an upper and a lower limit. A biasing device includes a fixed arm and a rake arm for urging the jacket toward the upper limit. A support bracket is detachably coupled to a mounting component connected to the vehicle. The support bracket is coupled to and supports the jacket during the movements and is movable with the jacket during the collapsing movement. A friction member is mounted to the support bracket and at least partially encircles the fixed arm and engages the fixed arm to form a friction-fit. The friction member slides along the fixed arm during the collapsing movement for transferring energy from the jacket and the support bracket to the biasing device.

17 Claims, 5 Drawing Sheets

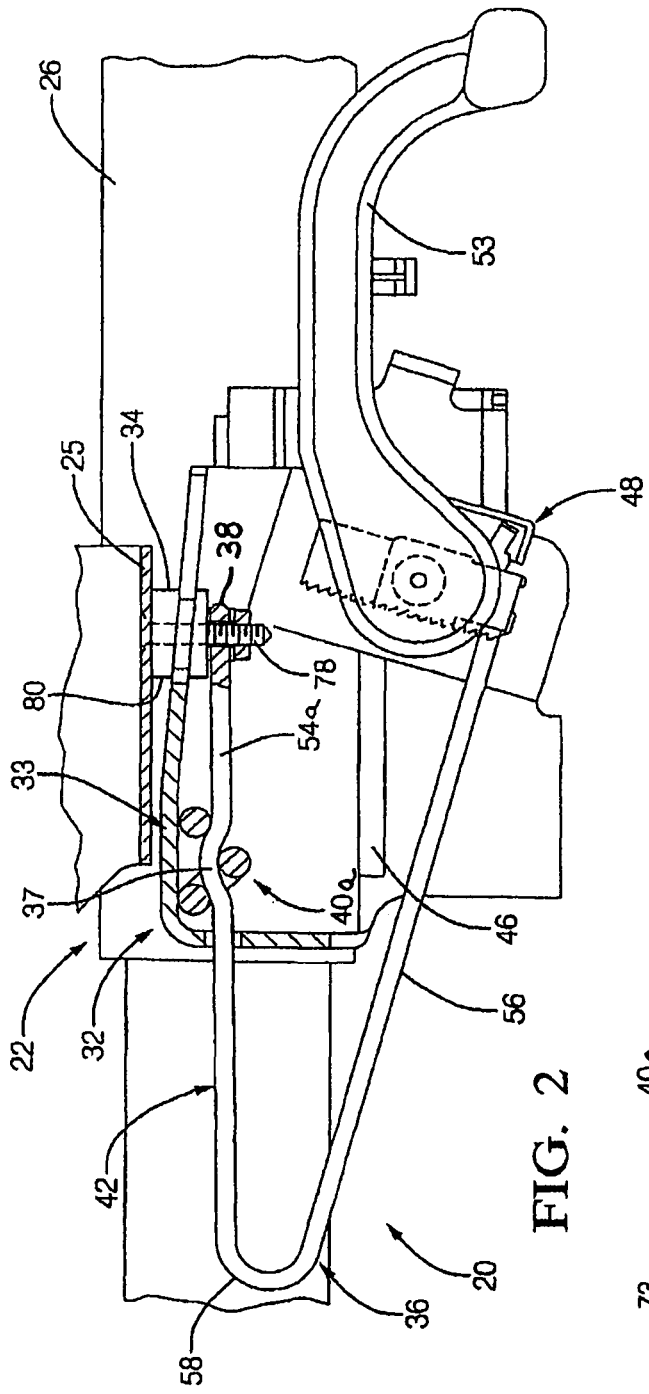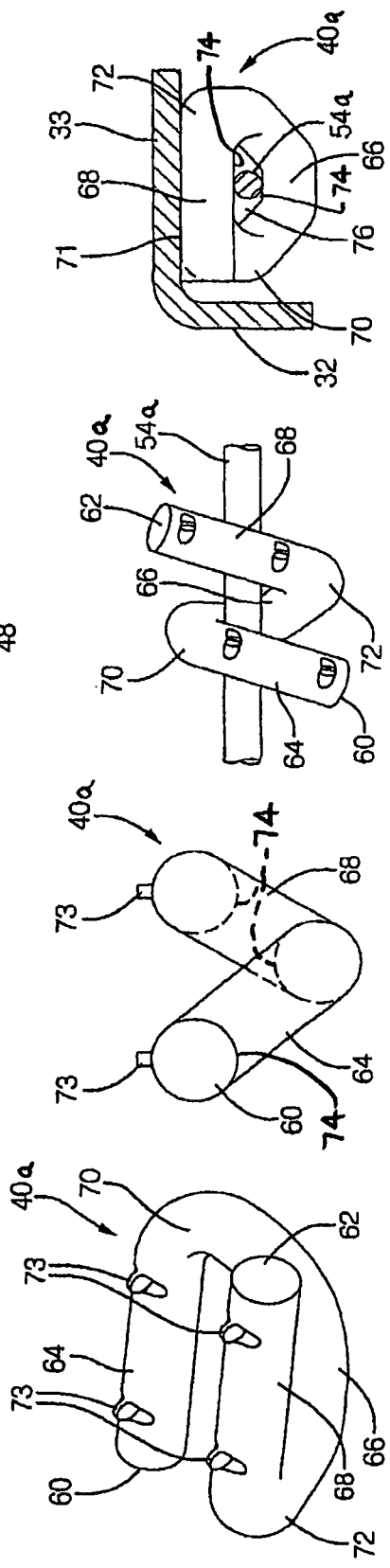

ENERGY ABSORBING STEERING COLUMN ASSEMBLY

BACKGROUND OF THE INVENTION

1. Field of the Invention

The present invention relates to a collapsible steering column assembly for a motor vehicle.

2. Description of the Prior Art

Collapsible steering column assemblies are designed to absorb at least a portion of force exerted when an operator strikes a steering wheel during a collision event by allowing a collapsing movement of a steering column along a longitudinal axis. Steering column assemblies also commonly allow the operator to adjust a position of the steering wheel relative to the operator for driving comfort during normal vehicle operation. Common adjustments include telescoping movement of the steering column along the longitudinal axis and tilting or raking movement of the steering column along a pivot axis. Collapsible steering column assemblies generally include at least one of these adjustments.

Energy absorbing devices are commonly incorporated into collapsible steering column assembly designs. Generally, the energy absorbing device is an additional single function component such as a deformable metal strap or wire, added to the steering column assembly solely to absorb energy during the collision event. Occasionally the energy absorbing devices also serve another function. An example of such an assembly is disclosed in U.S. Pat. No. 5,961,146 to Matsumoto, et. al.

The steering column assembly of the Matsumoto '146 patent allows the collapsing and tilting movements of the steering column as previously discussed. A wire is used primarily as the energy absorbing device and can also be used as a biasing device to help support the steering column during the tilting movement. A support bracket is mounted to the vehicle and the jacket is mounted to a carriage bracket which is coupled to the support bracket by a locking mechanism. The locking mechanism includes a lock bolt. The biasing device is connected to the carriage bracket and moves with the jacket along the longitudinal axis during the collapsing movement. The support bracket and locking mechanism, including the lock bolt, remain connected to the vehicle during the collapsing movement. Energy from the jacket is transferred to the biasing device as the biasing device is pulled over and bent around the lock bolt, severely deforming the biasing device.

There remains a need for an energy absorbing device that adapts existing components of the steering column assemblies without degrading or compromising the effectiveness of the components. Additionally, there remains a need for an energy absorbing device which uses an existing component such as a biasing device in steering column assemblies that incorporate the telescoping movement.

SUMMARY OF THE INVENTION AND ADVANTAGES

The present invention provides a collapsible steering column assembly for a vehicle having a steering column with a jacket movable along a longitudinal axis for telescoping movement and collapsing movement. The jacket is movable about a pivot axis for tilting movement between an upper limit and a lower limit. A support bracket is coupled to the jacket for supporting the jacket during the movements and is movable with the jacket during the collapsing movement. A friction member is mounted to the support bracket and is movable with the support bracket along the longitudinal axis during the collapsing movement. A biasing device is coupled to the jacket for urging the jacket toward the upper limit. The friction member engages a portion of the biasing device and slides along the biasing device during the collapsing movement for transferring energy from the jacket and the support bracket to the biasing device.

Although energy absorbing devices are widely used, additional special purpose components used solely for energy absorption during a collision event are generally employed. Even when existing components are used for energy absorption, this can result in less than effective performance of the energy absorbing device for one or both purposes. The present invention uses a biasing device for an energy absorption device without compromising performance, and thus offers the advantage of simpler and less expensive manufacturing while providing an effective method of energy absorption for adjustable steering columns incorporating both telescoping and tilting movements.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a cross-sectional side view of an alternative embodiment of the steering column assembly illustrating a friction member, a jacket, a support bracket, a biasing member and a locking mechanism;

FIG. 3A is a top perspective view of the friction member shown in FIG. 2;

FIG. 3B is a side perspective view of the friction member shown in FIG. 2;

FIG. 3C is a top perspective view of the friction member and a portion of the biasing device shown in FIG. 2;

FIG. 3D is a cross-sectional front perspective view of the friction member and the portion of the biasing device shown in FIG. 2;

DETAILED DESCRIPTION OF THE INVENTION

Figure 1:
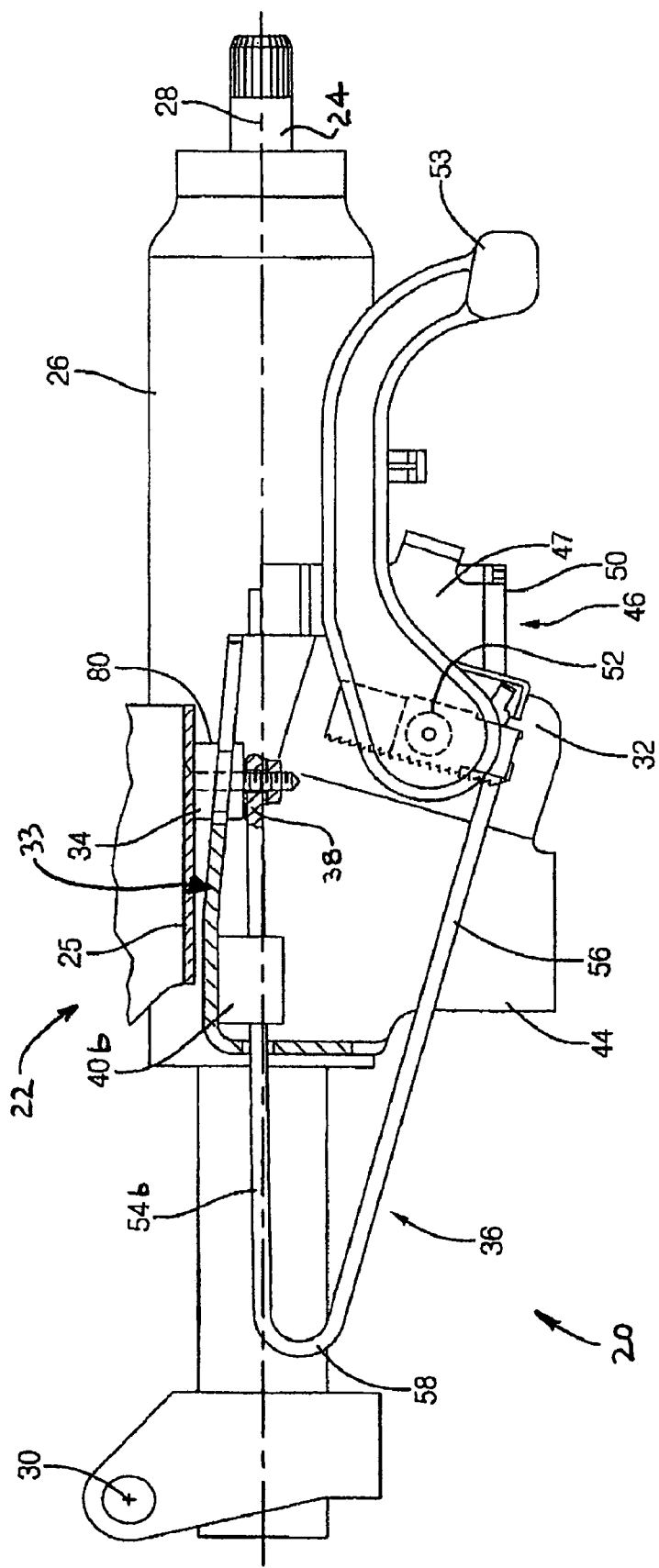
FIG. 1 is a cross-sectional side view of one embodiment of a steering column assembly illustrating a friction member, a jacket, a support bracket, a biasing member and a locking mechanism.

Referring to the Figures, wherein like numerals indicate corresponding parts throughout the several views, a collapsible steering column assembly is shown generally at 20 in FIGS. 1-2. The collapsible steering column assembly 20 includes a steering column 22 having a shaft 24 which extends into an operator compartment of a vehicle for accepting a steering wheel (not shown). The steering column 22 has a jacket 26 movable along a longitudinal axis 28 corresponding to a collapsing movement initiated by a collision event. The jacket 26 is also movable along the longitudinal axis 28 corresponding to telescoping movement and is movable about a pivot axis 30 corresponding to tilting movement between an upper limit and a lower limit, enabling an operator to adjust the steering column 22 during the normal course of operation of the vehicle.

The jacket 26 is generally cylindrical, having a length extending along the longitudinal axis 28. The jacket 26 is mounted to a carriage bracket 46 which has a pair of sides 47 and a base 50, generally defining a channel. The jacket 26 is mounted to the sides 47, and is partially disposed within the channel.

A support bracket 32 is provided for supporting the jacket 26 during the movements. The support bracket 32 is coupled to the jacket 26 and is movable with the jacket 26 during the collapsing movement. The support bracket 32 is generally disposed about the jacket 26 and includes a pair of walls 44 disposed on opposite sides of the jacket 26. The support bracket 32 further includes a platform 33 extending outwardly from each of the walls 44 in opposite directions relative to the jacket 26. The carriage bracket 46 is generally disposed between the walls 44 of the support bracket 32, with the carriage bracket 46 being movable with the jacket 26 during the movements.

A mounting component 34 is connected to the vehicle 25 and the support bracket 32 is detachably coupled to the mounting component 34. The mounting component 34 includes a stud 78 mounted to the vehicle 25. The support bracket 32 remains stationary relative to the vehicle 25 during the telescoping and tilting movements. The stud 78 can be any suitable shape and mounted to the vehicle 25 in any suitable manner.

The mounting component further includes a capsule 80 coupled to the stud 78 and to the platform 33 of the support bracket 32. When a force in excess of a predetermined level is applied to the support bracket 32, as during a collision event, the capsule 80 releases the support bracket 32 which detaches from the stud 78 so that the support bracket 32 can move along the longitudinal axis 28 during the collapsing movement. Capsules 80 that release support brackets 32 for detachment from the vehicle 25 are well known in the art and are not the subject of the present invention. It can be readily appreciated that the capsule 80 can be constructed in any suitable manner, for instance, a plurality of pins can be disposed within the capsule 80 that shear upon a predetermined level of force to allow a portion of the capsule 80 to break away from the rest of the capsule 80.

A locking mechanism 48 includes a lock bolt 52 which extends generally transverse to the longitudinal axis 28, and passes through the walls 44 of the support bracket 32 and the sides 47 of the carriage bracket 46 to couple the support bracket 32 to the carriage bracket 46 and the jacket 26. The locking mechanism 48 includes a handle 53 for allowing the operator to engage the locking mechanism 48 for preventing the movements of the jacket 26 and to disengage the locking mechanism 48 for allowing the tilting and the telescoping movements of the jacket 26. The locking mechanism 48 is movable with the support bracket 32 and the jacket 26 during the collapsing movement. The coupling of the jacket 26 to the support bracket 32 and the locking mechanism 48 have been only generally treated because they are not the subject of this invention. It can be readily appreciated that the coupling of the jacket 26 to the support bracket 32 and the locking mechanism 48 can be accomplished in any suitable manner.

Figure 4:
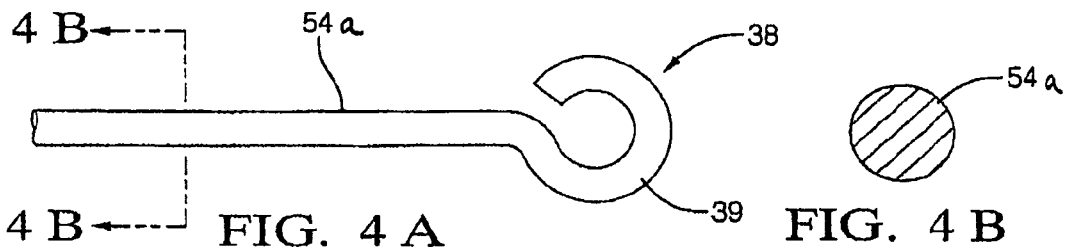
FIG. 4A is a planar top view of a fixed end of the biasing device shown in FIG. 2.
FIG. 4B is a cross-sectional view taken along line 4B-4B of FIG. 4A.

A biasing device 36 is coupled to the jacket 26 for urging the jacket 26 toward the upper limit. The biasing device 36 includes a fixed end 38 for fixedly coupling the biasing device 36 to the vehicle 25 during all of the movements. Referring to FIGS. 4A-4B, the biasing device 36 is generally wire-like having a generally circular cross-section and defining a thickness. It can be appreciated that other cross-sectional shapes such as an ellipse or rectangle are possible. Similarly, a variety of thicknesses are possible depending on the requirements of the specific application. In addition, the shapes and the thickness of the biasing device 36 can vary throughout the biasing device 36. As discussed previously, the biasing device 36 includes a fixed end 38 for fixedly coupling the biasing device 36 to the vehicle 25. The fixed end can be any number of shapes and can be fixedly coupled to the vehicle 25 in any suitable manner. For example, the fixed end 38 can include an eye 39 for engaging the stud 78 of the mounting component 34.

The portion 42 of the biasing device 36 that engages the friction member 40 is further defined as a fixed arm 54 (shown in the drawings and also referred to hereinbelow more particularly as either 40a and 54a, or 40b and 54b, depending on the respective embodiment). The fixed arm 54 extends generally along the longitudinal axis 28. The fixed arm 54 is substantially straight along a length to facilitate a uniform friction force when the friction member 40 slides along the fixed arm 54 to provide a predictable rate of energy absorption by the fixed arm 54. The fixed arm 54 is generally rigid. It can be readily appreciated that manufacturing, design and performance constraints can require that the fixed arm 54 incorporate a variety of shapes. For example, a slight bend 37 can be used to facilitate insertion of the fixed arm 54 into the friction member 40 during manufacturing. As discussed previously, the reason that the length is substantially straight is to facilitate a uniform friction force when the friction member 40 slides along the fixed arm 54. It can be readily appreciated that the portions of the fixed arm 54 which the friction member 40 does not slide along during the collapsing movement, can be any shape which allows the biasing device 36 to meet performance requirements of a specific application.

The biasing device 36 includes a rake arm 56 for urging the jacket 26 toward the upper limit. The rake arm 56 is substantially straight along a length though it can be appreciated that the rake arm 56 could have other shapes such as being curved. The rake arm 56 is connected to the fixed arm 54 by a living hinge 58. The living hinge 58 is continuous and integral with the fixed arm 54 and the rake arm 56. The living hinge 58 generally defines an acute angle however the specific degree of the angle can vary depending on the requirements of the application. The rake arm 56 engages the locking mechanism 48 and urges the jacket 26 toward the upper limit during the tilting movement. During the collapsing movement, the rake arm 56 preferably detaches from the locking mechanism 48. The rake arm 56 can be engaged to the locking mechanism 48 in any suitable manner. For example, the rake arm 56 can slide into a groove in the locking mechanism 48 or the rake arm 56 can include a contour that cooperates with a similar contour in the locking mechanism 48.

A friction member 40 is mounted to the support bracket 32 and is movable with the support bracket 32. The friction member 40 engages the fixed arm 54 of the biasing device 36 forming a friction-fit. During the collapsing movement, the support bracket 32 and friction member 40 move with the jacket 26 along the longitudinal axis 28. The friction member 40 slides along the fixed arm 54 of the biasing device 36, and because the fixed arm 54 remains coupled to the vehicle 25 by the fixed end 38, energy from the jacket 26 and support bracket 32 are transferred to the fixed arm 54 of the biasing device 36.

As is best shown in FIGS. 3A-3D, the friction member 40*a* includes first and second ends 60, 62 with a plurality of legs 64, 66, 68 interconnected between the ends 60, 62. The friction member 40 includes a first leg 64, a second leg 66 and a third leg 68. The first leg 64 extends from the first end 60 and is connected to the second leg 66 by a first curved section 70. The third leg 68 extends from the second end 62 and is connected to the second leg 66 by a second curved section 72. The friction member 40*a* at least partially encircles the fixed arm 54*a*, forming a friction-fit with the fixed arm 54*a*, and slides along the fixed arm 54*a* during the collapsing movement for transferring energy from the jacket 26 and the support bracket 32 to the fixed arm 54*a*. The legs 64, 66, 68 at least partially encircle the fixed arm 54*a*. The legs 64, 66, 68 can have a variety of cross-sectional shapes, for example, circular or square. The first, second and third legs 64, 66, 68 are in spaced and substantially parallel relationship with each other with the legs 64, 66, 68 extending transverse to the longitudinal axis 28. It can be appreciated that the friction member 40*a* can be manufactured in a number of ways. For example, the friction member 40*a* can be formed from a single unitary post or a plurality of posts joined by a process such as welding.

The friction member 40*a* is mounted to the platform 33 of the support bracket 32 by the first and third legs 64, 68. The mounting of the legs 64, 68 on the platform 33 of the support bracket 32 can be accomplished by in any reasonable manner, for example, the legs 64, 68 can include projections 73 which are welded to the platform 33. Similarly the platform 33 can include a plurality of ribs 71 for mounting the legs 64, 68 to the platform 33. It be readily appreciated that the friction member 40*a* can include any number of legs 64, 66, 68 and curved sections 70, 72 and the orientation of the legs 64, 66, 68 to each other and in relation to the longitudinal axis 28 can vary depending on the materials used and the amount of energy absorption required by a specific application.

The friction member 40*a* includes an inner surface 74 which defines a passageway 76 and the inner surface 74 engages the fixed arm 54*a*. Because the legs 64, 66, 68 are in spaced relationship with each other, the inner surface 74 of the friction member 40*a* is discontinuous, having open spaces where there is no contact between the fixed arm 54*a* and the friction member 40*a*. The passageway 76 has a height and width which can vary within the passageway 76, and as a result, the passageway 76 can have a variety of shapes. For example, force can be applied to the second leg 66 during the mounting of the friction member 40*a* to the platform 33 which will produce a slightly curved passageway 76. The resulting restriction in the passageway 76 makes the friction-fit tighter and the friction created as the friction member 40*a* slides along the generally rigid fixed arm 54*a* is increased.

The friction-fit between the fixed arm 54*a* and the friction member 40*a* allows the transfer of energy from the jacket 26 and the support bracket 32 to the fixed arm 54*a*. If the friction-fit is too tight or the shape of the passageway 76 too restrictive, the fixed arm 54*a* will not be able to slide adequately during the collapsing movement. Conversely, if the friction-fit is too loose, the friction member 40*a* will be allowed to move too easily along the fixed arm 54*a* and not enough resistance will be created to effect the transfer of energy from the jacket and support bracket. It can be readily appreciated that the thickness, width, height and shape of the passageway 76 and the fixed arm 54*a* can vary in order to achieve the friction-fit required for a given application.

During the operation of the vehicle 25, the operator can select a position for the steering wheel by adjusting the position of the jacket 26 using one or both of the tilting and telescoping movements discussed previously. The telescoping movement occurs when the jacket 26 moves along the longitudinal axis 28. The pivoting movement occurs when the jacket 26 moves about the pivot axis 30. To initiate the telescoping and tilting movements, the operator uses the handle 53 to disengage the locking mechanism 48 as previously discussed. The jacket 26 which is movably coupled to the support bracket 32 moves along the longitudinal axis 28 for the telescoping movement and about the pivot axis 30 between the upper and lower limit for the tilting movement. The support bracket 32 and the fixed arm 54*a*, both of which are coupled to the vehicle 25, do not move. When the operator has selected the desired position of the steering wheel, the operator uses the handle 53 to engage the locking mechanism 48 as previously discussed, to retain the jacket 26 in the selected position.

Figure 5:
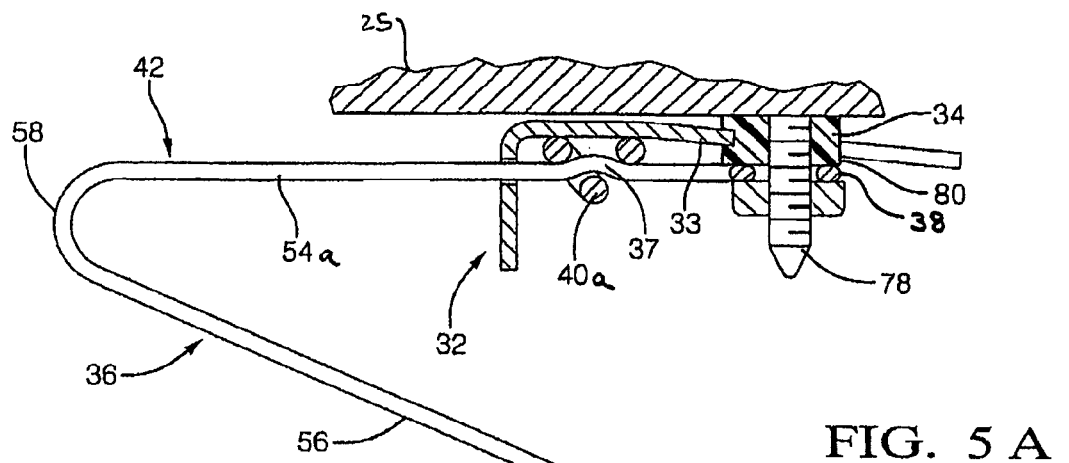
FIG. 5A is a fragmented partial cross-section of the support bracket, biasing device and friction member relative to the vehicle and a mounting component shown in FIG. 2 prior to a collision event.
FIG. 5B is a fragmented partial cross-section of the support bracket, biasing device and friction member relative to the vehicle and the mounting component shown in FIG. 2 after or during the collision event.
Figure 5:
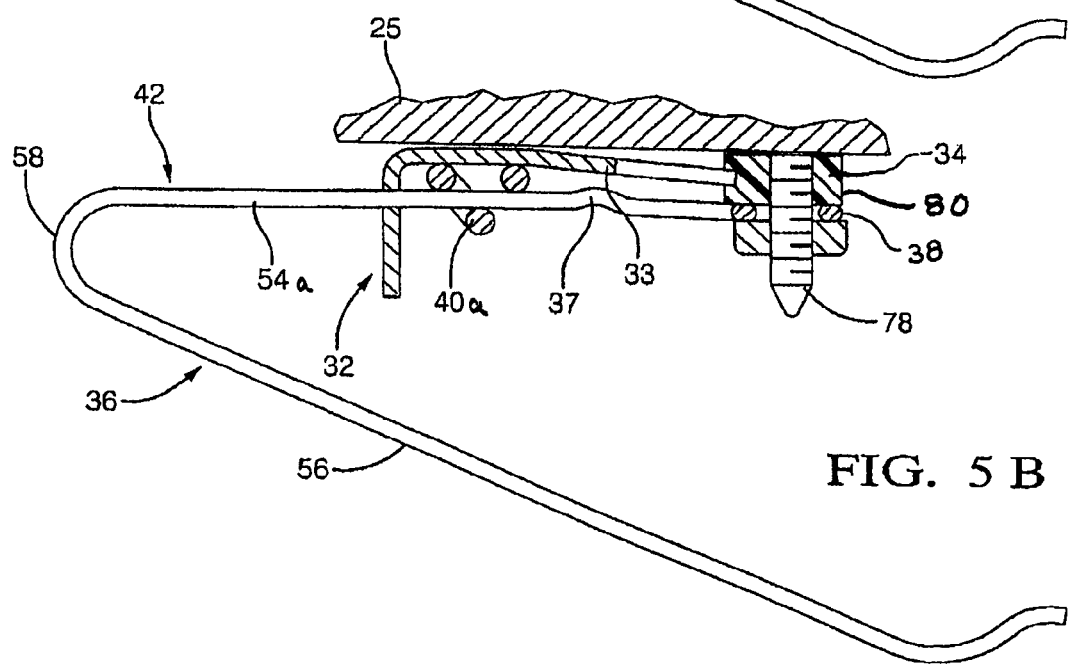
Figure 6A:
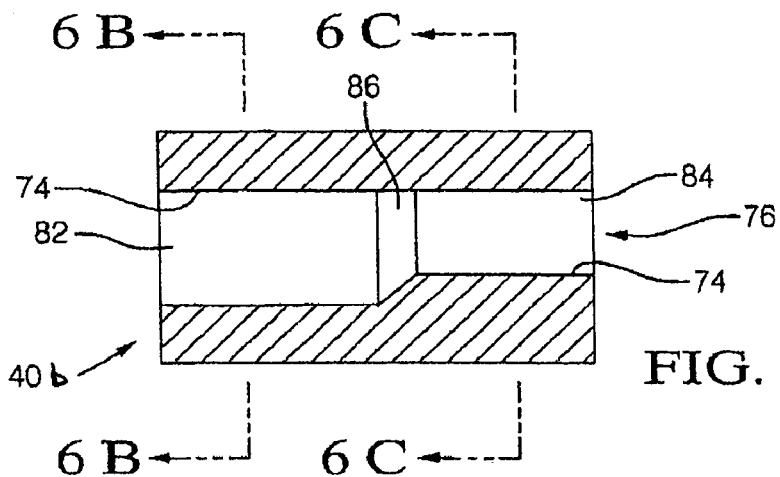
FIG. 6A is a cross-sectional top view of an alternative embodiment of the friction member shown in FIG. 1.
Figure 6B:
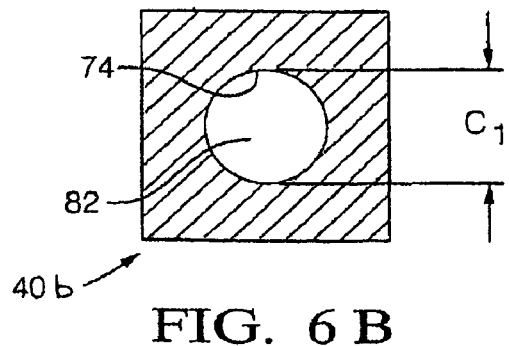
FIG. 6B is a cross-sectional view taken along line 6B-6B in FIG. 6A.
Figure 6C:
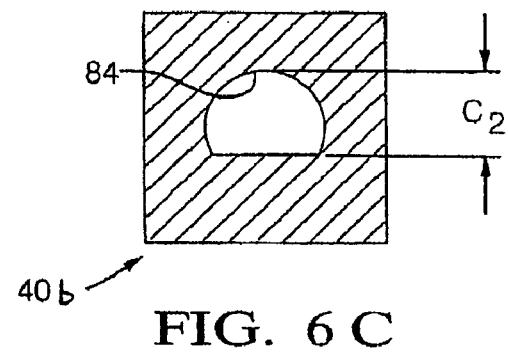
FIG. 6C is a cross-sectional view taken along line 6C-6C in FIG. 6A.
Figure 7A:
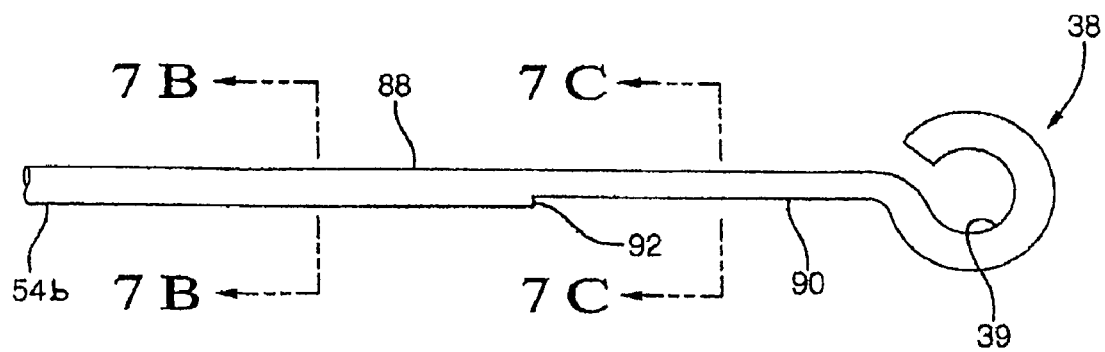
FIG. 7A is a planar top view of the alternative embodiment of the biasing device shown in FIG. 1.
Figure 7B:
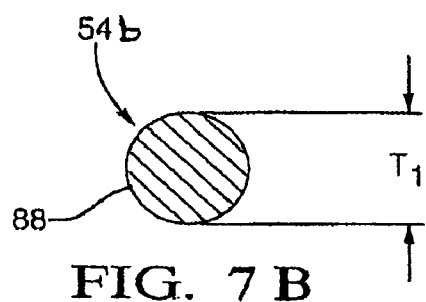
FIG. 7B is the cross-sectional view taken along line 7B-7B in FIG. 7A.
Figure 7C:
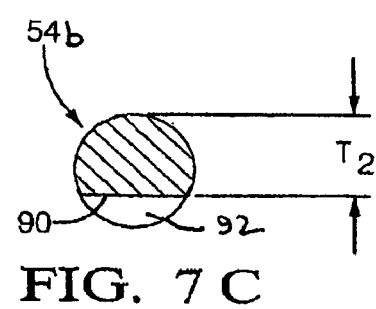
FIG. 7C is a cross-sectional view taken along line 7C-7C in FIG. 7A.

During the collision event, a force is exerted on the steering column 22 by the operator as a result of the operator striking the steering wheel. This initiates the collapsing movement. As a result, force is exerted on the jacket 26 and the support bracket 32 which are coupled to each other by the engaged locking mechanism 48. In response to force in excess of the predetermined level, the support bracket 32 releases from the capsule 80 and detaches from the stud 78 mounted to the vehicle 25. The fixed arm 54*a*, however, remains connected to the vehicle 25. The support bracket 32, jacket 26 and locking mechanism 48 moving together, continue the collapsing movement along the longitudinal axis 28. The friction member 40*a* mounted to the support bracket 32, slides along the fixed arm 54*a*. The friction member 40*a* slides in a substantially straight path along the fixed arm 54*a*, and as a result of the friction-fit, energy is transferred from the jacket 26 and the support bracket 32 to the fixed arm 54*a* and the rate of travel of the jacket 26 and support bracket 32 along the longitudinal axis 28 is reduced. Referring to FIGS. 5A-5B, the change in positions of the support bracket 32, friction member 40*a*, mounting component 34 and fixed arm 54*a* relative to the vehicle 25 is illustrated. Referring to FIG. 5A, prior to the collision event, the support bracket 32 is coupled to the mounting component 34. FIG. 5B illustrates the change after the collision event. The support bracket 32 has released from the capsule 80 of the mounting component 34 detaching from the stud 78 connected to the vehicle 25 and has moved along the longitudinal axis 28. The fixed arm 54*a*, however, has remained connected to the vehicle 25, in this case shown as remaining connected to the stud 78. The friction member 40*a* has moved with the support bracket 32, sliding along the length of the fixed arm 54*a*. The friction member 40*a* slides along a relatively straight path, however it is possible that some distortion of the biasing device 36 can occur, depending on configuration, materials used and magnitude of force exerted on the steering column 22.

Referring to FIGS. 6A-8B, an alternative embodiment of the friction member 40 and fixed arm 54 are illustrated. The inner surface 74 of friction member 40*b* is continuous along a length, and substantially encapsulates the fixed arm 54*b*. Because the inner surface 74 is continuous, the height and the width of the passageway 76 further define a cross-sectional area. The passageway 76 is further defined as a first zone 82 having a first cross-sectional area $C_1$ and a second zone 84 having a second cross-sectional $C_2$ area smaller than the first cross-sectional area $C_1$ of the first zone 82. The passageway 76 further includes a tapered zone 86 connecting the first zone 82 and the second zone 84. The fixed arm 54*b* includes a first section 88 defining a first thickness $T_1$ complementary in configuration to the first zone 82, a tapered section 92 complementary in configuration to the tapered zone 86, and a second section 90 with a second thickness $T_2$ complementary in configuration to the second zone 84. During the collapsing movements, the inner surface 74 defining the tapered zone 86, presses against the first section 88 of the fixed arm 54*b* as the friction member 40*b* slides along the fixed arm 54*b*. The first section 88 of the fixed arm 54*b* is forced through a decreasing cross-sectional area, and as a result, the first section 88 of the fixed arm 54*b* is extruded and lengthened. It can be readily appreciated that the cross-sectional areas of the zones 82, 84, 86 can vary depending upon the requirements of a specific application. Similarly, the zones 82, 84, 86 can have a variety of cross-sectional shapes, for example, circular or D-shaped.

Figure 8A:
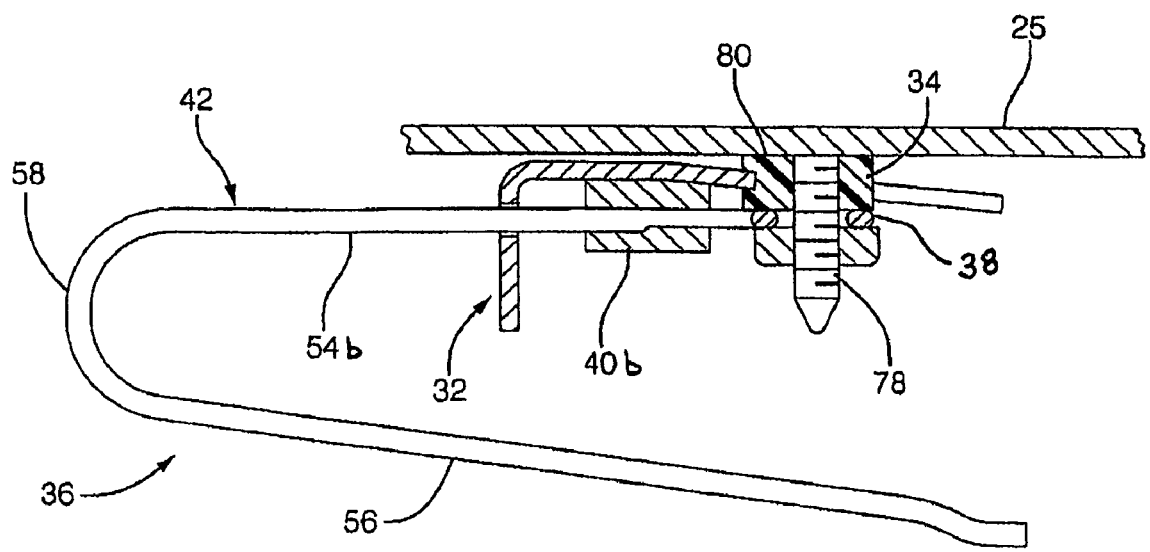
FIG. 8A is a fragmented partial cross-sectional side view of the support bracket, and alternative embodiments of the biasing device and friction member relative to the vehicle and the mounting component shown in FIG. 1, with the friction member and portion of the biasing device rotated 90° into view for clarity, prior to a collision event.
Figure 8B:
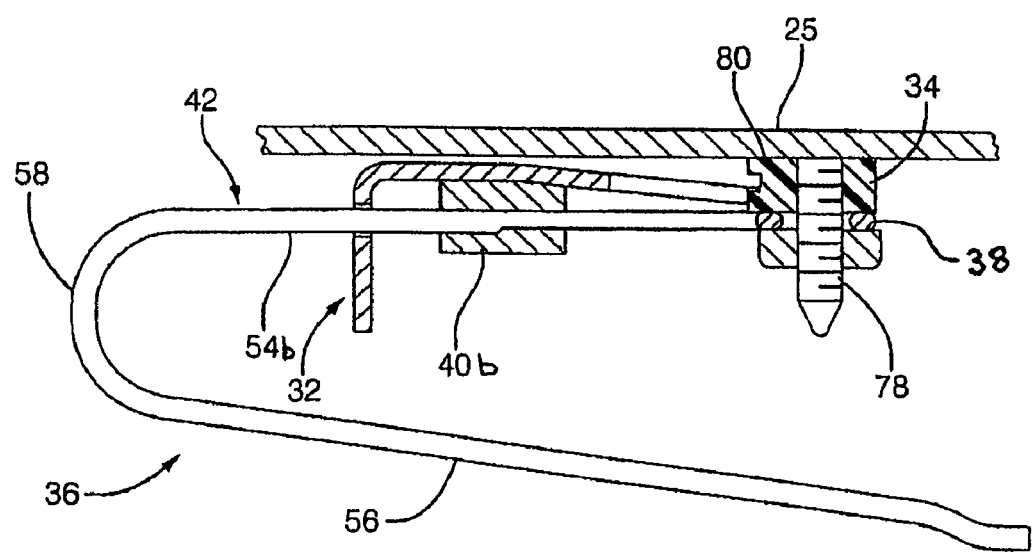
FIG. 8B is a fragmented partial cross-sectional side view of the support bracket, and alternative embodiments of the biasing device and friction member relative to the vehicle and the mounting component shown in FIG. 1, with the friction member and portion of the biasing device rotated 90° into view for clarity, after or during the collision event.

Referring to FIGS. 8A-8B, the change in the positions of the support bracket 32, friction member 40*b*, mounting component 34 and fixed arm 54*b* relative to the vehicle 25 is illustrated. Referring to FIG. 8A, prior to the collision event, the support bracket 32 is coupled to the mounting component 34. The collapsing movement of the steering column 22 is very similar to the collapsing movement described in the preferred embodiment. Once the collapsing movement commences, however, the friction member 40*b* and fixed arm 54*b* interact differently to effect the transfer of energy from the jacket and support bracket 32 to the fixed arm 54*b*. As with the preferred embodiment, during the collapsing movement, the support bracket 32 releases from capsule 80 of the mounting component 34 and detaches from the stud 78 connected to the vehicle 25 while the fixed arm 54*b* remains connected to the vehicle 25. As the friction member 40*b* begins to slide along the fixed arm 54*b*, however, the friction member 40*b* operates as an extrusion die. The fixed arm 54*b* is forced from the first zone 82 having the larger cross-sectional area $C_1$ through the tapered zone 86 into the second zone 84 having the smaller cross-sectional area $C_2$.

FIG. 8B illustrates the change after the collision event. The support bracket 32 which has released from the mounting component 34 has moved along the longitudinal axis 28. The fixed arm 54*b*, however, has remained connected to the vehicle 25, in this case shown as remaining connected to the stud 78. The friction member 40*b* has moved with the support bracket 32, sliding along the fixed arm 54*b*. The fixed arm 54*b* has been lengthened as a result of the extrusion.

Obviously, many modifications and variations of the present invention are possible in light of the above teachings without departing from the essential scope thereof. Therefore, the invention is not intended to be limited to the particular embodiment disclosed, but that the invention will include all embodiments falling within the scope of the appended claims. The reference numerals are merely for convenience and are not to be read in any way as limiting.

What is claimed is:

1. A collapsible steering column assembly for a vehicle, said assembly comprising:

a steering column having a jacket, said jacket having telescoping movement and collapsing movement along a longitudinal axis, said jacket having tilting movement about a pivot axis between an upper limit and a lower limit;

a support bracket coupled to said jacket, said jacket supported by said support bracket during said movements, said support bracket moved with said jacket during said collapsing movement;

a friction member mounted to said support bracket, said friction member moved with said support bracket along said longitudinal axis during said collapsing movement;

a biasing device coupled to said jacket, said jacket urged by said biasing device toward said upper limit; and said friction member engaged with a portion of said biasing device, said friction member having sliding movement along said biasing device during said collapsing movement, energy transferred through said sliding movement from said jacket and said support bracket to said biasing device, said friction member including an inner surface defining a passageway with said inner surface engaging said portion of said biasing device.

2. An assembly as set forth in claim 1 wherein said portion of said biasing device has a thickness and said passageway has a height and a width with at least one of said height and said width being substantially identical to said thickness of said biasing device for forming a friction-fit between said friction member and said biasing device.

3. An assembly as set forth in claim 2 wherein said inner surface is continuous along a length and substantially encapsulates said portion of said biasing device.

4. An assembly as set forth in claim 3 wherein said portion of said biasing device is further defined as a fixed arm with said thickness of said fixed arm being complementary in configuration with said height and said width of said passageway.

5. An assembly as set forth in claim 4 wherein said passageway includes a first zone defining a first cross-sectional area and a second zone defining a second cross-sectional area smaller than said first cross-sectional area of said first zone.

6. An assembly as set forth in claim 5 wherein said fixed arm includes a first section complementary in configuration with said first zone and a second section complementary in configuration with said second zone.

7. An assembly as set forth in claim 6 wherein said passageway further includes a tapered zone connecting said first zone and said second zone.

8. An assembly as set forth in claim 7 wherein said fixed arm includes a tapered section complementary in configuration with said tapered zone.

9. A collapsible steering column assembly for a vehicle, said assembly comprising:

a steering column having a jacket, said jacket having telescoping movement and collapsing movement along a longitudinal axis, said jacket having tilting movement about a pivot axis between an upper limit and a lower limit;

a support bracket coupled to said jacket, said jacket supported by said support bracket during said movements, said support bracket moved with said jacket during said collapsing movement;

a friction member mounted to said support bracket, said friction member moved with said support bracket along said longitudinal axis during said collapsing movement;

a biasing device coupled to said jacket, said jacket urged by said biasing device toward said upper limit; and said friction member engaged with a portion of said biasing device, said friction member having sliding movement along said biasing device during said collapsing movement, energy transferred through said sliding movement from said jacket and said support bracket to said biasing device, said friction member at least partially encircling said portion of said biasing device.

10. A collapsible steering column assembly for a vehicle, said assembly comprising:

a steering column having a jacket, said jacket having telescoping movement and collapsing movement along a longitudinal axis, said jacket having tilting movement about a pivot axis between an upper limit and a lower limit;

a support bracket coupled to said jacket, said jacket supported by said support bracket during said movements, said support bracket moved with said jacket during said collapsing movement;

a friction member mounted to said support bracket, said friction member moved with said support bracket along said longitudinal axis during said collapsing movement;

a biasing device coupled to said jacket, said jacket urged by said biasing device toward said upper limit;

said friction member engaged with a portion of said biasing device, said friction member having sliding movement along said biasing device during said collapsing movement, energy transferred through said sliding movement from said jacket and said support bracket to said biasing device, said portion of said biasing device is further defined as a fixed arm engaged with said friction member with said fixed arm being substantially straight along a length by which a uniform frictional force is facilitated when said friction member has sliding movement along said biasing device; and said biasing device further including a rake arm and a living hinge with said living hinge connecting said fixed arm and said rake arm and with said rake arm urging said jacket toward said upper limit.

11. An assembly as set forth in claim 10 wherein said biasing device is substantially wire-like having a generally circular cross-section.

12. A collapsible steering column assembly for a vehicle, said assembly comprising:

a steering column having a jacket, said jacket having telescoping movement and collapsing movement along a longitudinal axis, said jacket having tilting movement about a pivot axis between an upper limit and a lower limit;

a support bracket coupled to said jacket, said jacket supported by said support bracket during said movements, said support bracket moved with said jacket during said collapsing movement;

a friction member mounted to said support bracket, said friction member moved with said support bracket along said longitudinal axis during said collapsing movement;

a biasing device coupled to said jacket, said jacket urged by said biasing device toward said upper limit;

said friction member engaged with a portion of said biasing device, said friction member having sliding movement along said biasing device during said collapsing movement, energy transferred through said sliding movement from said jacket and said support bracket to said biasing device; and said biasing device including a fixed end for fixedly coupling said biasing device to the vehicle to prevent movement of said biasing device along said longitudinal axis during said collapsing movement of said support bracket and said jacket.

13. A collapsible steering column assembly for a vehicle, said assembly comprising:

a steering column having a jacket, said jacket having telescoping movement and collapsing movement along a longitudinal axis, said jacket having tilting movement about a pivot axis between an upper limit and a lower limit;

a support bracket coupled to said jacket, said jacket supported by said support bracket during said movements, said support bracket moved with said jacket during said collapsing movement;

a friction member mounted to said support bracket, said friction member moved with said support bracket along said longitudinal axis during said collapsing movement;

a biasing device coupled to said jacket, said jacket urged by said biasing device toward said upper limit;

said friction member engaged with a portion of said biasing device, said friction member having sliding movement along said biasing device during said collapsing movement, energy transferred through said sliding movement from said jacket and said support bracket to said biasing device; and a mounting component coupled to said support bracket, said support bracket detachably coupled to the vehicle through said mounting component, said mounting component including a stud, said mounting component connected to the vehicle through said stud, and a capsule engaged with said support bracket, said support bracket coupled to said stud through said capsule during said telescoping movement and said tilting movement, disengagement of said support bracket from said stud allowed by said capsule when a force is exerted on said jacket in excess of a predetermined level, by which disengagement said collapsing movement is allowed.

14. A collapsible steering column assembly for a vehicle, said assembly comprising:

a steering column having a jacket, said jacket having telescoping movement and collapsing movement along a longitudinal axis, said jacket having tilting movement about a pivot axis between an upper limit and a lower limit;

a support bracket coupled to said jacket, said jacket supported by said support bracket during said movements, said support bracket moved with said jacket during said collapsing movement;

a friction member mounted to said support bracket, said friction member moved with said support bracket along said longitudinal axis during said collapsing movement;

a biasing device coupled to said jacket, said jacket urged by said biasing device toward said upper limit; and said friction member engaged with a portion of said biasing device, said friction member having sliding movement along said biasing device during said collapsing movement, energy transferred through said sliding movement from said jacket and said support bracket to said biasing device, said friction member including first and second ends with a plurality of legs interconnected between said ends and said legs at least partially encircling said portion of said biasing device.

15. An assembly as set forth in claim 14 wherein said plurality of legs includes a first leg and a second leg, a first curved section connecting said first leg to said second leg, a third leg, and a second curved section connecting said second leg to said third leg.

16. An assembly as set forth in claim 15 wherein said first, second and third legs are in spaced and substantially parallel relationship with each other and extend transverse to said longitudinal axis.

17. An assembly as set forth in claim 15 wherein said first leg and said third leg are mounted to said support bracket.

\* \* \* \* \*